(12) United States Patent
Maki

(10) Patent No.: US 7,924,449 B2
(45) Date of Patent: Apr. 12, 2011

(54) DATA PROCESSING APPARATUS, METHOD, AND PROGRAM

(75) Inventor: Nobuhiko Maki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1393 days.

(21) Appl. No.: 10/953,148

(22) Filed: Sep. 28, 2004

(65) Prior Publication Data

US 2005/0073716 A1    Apr. 7, 2005

(30) Foreign Application Priority Data

Oct. 7, 2003  (JP) ................................ 2003-348386

(51) Int. Cl.
*G06F 3/12* (2006.01)

(52) U.S. Cl. ........ 358/1.15; 358/1.9; 709/220; 709/223; 709/227; 710/8

(58) Field of Classification Search ................. 358/1.15, 358/401, 1.9; 710/12, 8; 709/200, 220, 227, 709/223
See application file for complete search history.

(56) References Cited

U.S. PATENT DOCUMENTS

| | | | | |
|---|---|---|---|---|
| 5,228,118 A * | 7/1993 | Sasaki | ........................... | 358/1.13 |
| 5,636,333 A * | 6/1997 | Davidson et al. | ............ | 358/1.15 |
| 6,115,132 A * | 9/2000 | Nakatsuma et al. | ......... | 358/1.14 |
| 6,219,706 B1 * | 4/2001 | Fan et al. | ..................... | 709/225 |
| 6,574,470 B1 * | 6/2003 | Chow et al. | .................... | 455/417 |
| 6,615,372 B1 * | 9/2003 | Wang | ............................... | 714/46 |
| 6,618,360 B1 * | 9/2003 | Scoville et al. | ............... | 370/248 |
| 6,697,073 B1 * | 2/2004 | Kadota | ......................... | 345/501 |
| 7,113,298 B2 * | 9/2006 | Mochizuki | .................... | 358/1.15 |
| 7,190,477 B2 * | 3/2007 | Ferlitsch | ...................... | 358/1.15 |
| 7,281,064 B2 * | 10/2007 | Wanda | ............................ | 710/19 |
| 7,577,111 B2 * | 8/2009 | Yeung et al. | ................... | 370/310 |
| 2002/0015433 A1 | 2/2002 | Zimmermann | | |
| 2002/0144024 A1 * | 10/2002 | Kumpf et al. | ................... | 710/12 |
| 2002/0154333 A1 | 10/2002 | Akashi | | |
| 2004/0156074 A1 * | 8/2004 | Kim | ............................. | 358/1.15 |
| 2005/0248803 A1 * | 11/2005 | Ohara | ........................... | 358/1.15 |
| 2007/0076253 A1 * | 4/2007 | Shima | ........................... | 358/1.15 |

FOREIGN PATENT DOCUMENTS

| | | |
|---|---|---|
| JP | 2002-333958 | 11/2002 |
| JP | 2003-150347 | 5/2003 |

* cited by examiner

*Primary Examiner* — Twyler L Haskins
*Assistant Examiner* — Dennis Dicker
(74) *Attorney, Agent, or Firm* — Canon U.S.A., Inc., IP Division

(57) ABSTRACT

In response to a print request from a host computer, a port for receiving print data is assigned to the host computer, the host computer is notified of a URI representing the port that serves as a destination of print data, and the port is associated with the URI in a port-status management table. When a connection for sending print data from a host computer is established, the port-status management table is referred to. If the host computer is associated with the port of the connection, printing is executed. After receiving print data, the port is closed, and the port-status management table is updated to cancel the assignment of the port to the host computer.

10 Claims, 9 Drawing Sheets

FIG. 3

```xml
<env:Envelope xmlns:env="http://www.w3.org/2001/12/soap-envelope"
env:encodingStyle="http://www.w3.org/2001/12/soap-encoding"
xmlns:enc="http://www.w3.org/2001/12/soap-encoding">
 <env:Body>
  <bm:create_job xmlns:bm="urn:schemas-bmlinks-jp:service:bmlinks-1-2">
    <requesting-user-name>maki</requesting-user-name>
    <job-instruction>
     <job-instruction-params>
      <job-name>sample-job</job-name>
      <optional-attributes-finelity>false</optional-attributes-fidelity>
      <copies>1</copies>
      <finishings enc:arrayType="bm:finishing [1]">
       <finishing>staple</finishing>
      </finishings>
      <document-format>image/tiff</document-format>
     </job-instruction-params>
     <notification-instruction>
      <notification-recipient>http://123.456.7.8/event</notification-recipient>
       <events enc:arrayType="bm:event [2]">
        <event>job-completed</event>
        <event>job-canceled</event>
       </events>
     </notification-instruction>
    </job-instruction>
   </bm:create_job>
  </env:Body>
</env:Envelope>
```

FIG. 4

```
<env:Envelope xmlns:env="http://www. w3 org/2001/12/soap-envelope"
env:encodingStyle="http://www. w3. org/2001/12/soap-encoding"
xmlns:enc="http://www. w3. org/2001/12/soap-encoding">
    <env:Body>
      <bm:create_jobResponse xmlns:bm="urn:schemas-bmlinks-
jp:service:bmlinks-1-2">
        <result-code>ok</result-code>
        <job-id>001</job-id>
        <notification-subscription-id>1</notification-subscription-id>
          <data-sink-uri>
            http://123. 456. 7. 8:10001/job
          </data-sink-uri>
        </bm:create_jobResponse>
    </env:Body>
</env:Envelope>
```

FIG. 5

| PORT NUMBER | HOST IP ADDRESS | OPEN/CLOSE |
|---|---|---|
| 10001 | 123.456.1.xxx | OPEN |
| 10002 |  | CLOSE |
| 10003 | 123.456.2.xxx | OPEN |
| 10004 | 123.456.3.xxx | OPEN |

FIG. 6

| URI | HOST IP ADDRESS | OPEN/CLOSE |
|---|---|---|
| http://123.456.7.8:10001/job | 123.456.1.xxx | OPEN |
| http://123.456.7.8:10002/job |  | CLOSE |
| http://123.456.7.8:10003/job | 123.456.2.xxx | OPEN |
| http://123.456.7.8:10004/job | 123.456.3.xxx | OPEN |

FIG. 7

| PORT NUMBER | HOST IP ADDRESS |
|---|---|
| 10001 | 123.456.1.xxx |
| 10005 | 123.456.2.xxx |
| 10003 | 123.456.3.xxx |
| . | . |
| . | . |

DATA PROCESSING APPARATUS, METHOD, AND PROGRAM

CROSS-REFERENCE

This application claims priority from Japanese Patent Application No. 2003-348386 filed Oct. 7, 2003, which is hereby incorporated by reference herein.

BACKGROUND OF THE INVENTION

1. Field of the Invention

The present invention relates to a data processing apparatus, method, and program that process job data sent from a computer on a network, in accordance with a type of the job data.

2. Description of the Related Art

Network printers that are connected to a plurality of computers via networks such as LANs and that execute printing according to print requests from computers on the networks are commonly used. Generally, when print data from a plurality of computers is sent to the network printers, the print data is sent to a particular well-known port. For example, port number 515 is generally used for LPD, and port number 80 is generally used for HTTP.

Also, techniques for allowing a printer on a network to use a plurality of printing ports and to assign printing ports on a computer-by-computer basis are known. FIG. 11 shows exchange of data between host computers and a printer according to such techniques.

In more detail, first, in step S1101, the printer receives a print start request (create_job) from a computer on the network (hereinafter referred to as host computer A). The operation then proceeds to step S1102. In step S1102, if the create_job received from host computer A properly includes information such as an instruction regarding processing of a print job, the printer opens a printing port for receiving print data, and sends to host computer A a URI that serves as a destination when host computer A sends print data (hereinafter referred to as URI1). As described above, a port is specified using a URI. Then, in step S1103, a create_job is received from another computer on the network (hereinafter referred to as host computer B). Next, in step S1104, like in step S1102, a URI is sent, except the URI is sent to host computer B, and the URI is URI2 instead of URI1.

The URIs that serve as destinations for sending print data differ among host computers, and accordingly the ports that are used also differ among host computers.

In step S1105, in order to send print data, host computer A establishes a connection with the port represented by URI1 given in step S1102. The operation then proceeds to step S1106, in which print data is sent to the printer, and printing is executed.

Techniques of using a plurality of printing ports by assigning print ports individually for host computers that issue print start requests as described above are known.

Japanese Patent Laid-Open No. 2002-333958 (corresponding US Patent Application Publication No. 2002/0154333 A1) discloses an image processing apparatus that specifies host computers allowed to use ports individually for various ports, such as printing ports, management ports, and copying ports, and that allows or denies processing for job requests by host computers, such as printing requests, management requests, and copying requests. Also, techniques of dynamically assigning ports instead of using fixed port numbers on the basis of types of data processing are also disclosed.

According to the related art, the ports used for printing vary among host computers that issue print start requests. This requires management of port status as to whether or not each port is being used by one of the host computers. Furthermore, according to the related art, although ports used for printing vary among host computers, printing is executed even when print data is sent to URI1 by a host computer other than host computer A. Thus, printing could be blocked by a malicious user.

SUMMARY OF THE INVENTION

According to a feature of the present invention, a data processing apparatus is provided that manages ports used for processing jobs such that the ports are associated with host computers to which the ports are assigned, and that dynamically manages open ports and closed ports, for example, by closing ports for which processing has finished, thus preventing unauthorized acts such as print blocking.

According to another feature of the present invention, when a host computer that has sent job data is not associated with a port to which the job data has been sent, which would result in the job data not being processed, the job data is not received. Accordingly, useless exchange of data is reduced, and the efficiency of job processing is improved.

The present invention, in one aspect thereof, provides a data processing apparatus that processes job data received in accordance with a type of the job data, the data processing apparatus sending information representing a port for receiving job data to an information processing apparatus in response to a request from the information processing apparatus so that specified job data is received by the port. The data processing apparatus includes an assigning unit for assigning the port to the information processing apparatus that has sent the request, and a port-status management table for managing identification information for identifying the information processing apparatus and port information representing the port assigned to the information processing apparatus by the assigning unit, such that the identification information and the port information are associated with each other. When the port is specified for an information processing apparatus to send job data, job data is processed on condition that the information processing apparatus is an information processing apparatus that is associated with the port in the port-status management table, and the port is closed after completion of reception of the job data.

The present invention, in another aspect thereof, provides a data processing apparatus that processes job data received in accordance with a type of the job data, the data processing apparatus sending information representing a port for receiving job data to an information processing apparatus in response to a request from the information processing apparatus so that specified job data is received by the port. The data processing apparatus includes an assigning unit for assigning the port to the information processing apparatus that has sent the request, and a port-status management table for managing identification information for identifying the information processing apparatus and port information representing the port assigned to the information processing apparatus by the assigning unit, such that the identification information and the port information are associated with each other. When the port is specified by an information processing apparatus to send job data, job data is processed on condition that the information processing apparatus is an information processing apparatus that is associated with the port in the port-status management table, and the port-status management table is updated after completion of reception of the job data so as to cancel the association between the port and the information processing apparatus.

The present invention, in another aspect thereof, provides a data processing method for processing job data received in accordance with a type of the job data, in which a data processing apparatus sends information representing a port for receiving job data to an information processing apparatus in response to a request from the information processing apparatus so that specified job data is received by the port. The data processing method includes an assigning step of assigning the port to the information processing apparatus that has sent the request; and an accessing step of accessing a port-status management table that manages identification information for identifying the information processing apparatus and port information representing the port assigned to the information processing apparatus in the assigning step, such that the identification information and the port information are associated with each other. When the port is specified by an information processing apparatus to send job data, job data is processed on condition that the information processing apparatus is an information processing apparatus that is associated with the port in the port-status management table, and the port is closed after completion of reception of the job data.

The present invention, in another aspect thereof, provides a data processing method for processing job data received in accordance with a type of the job data, in which a data processing apparatus sends information representing a port for receiving job data to an information processing apparatus in response to a request from the information processing apparatus so that specified job data is received by the port. The data processing method includes an assigning step of assigning the port to the information processing apparatus that has sent the request; and an accessing step of accessing a port-status management table that manages identification information for identifying the information processing apparatus and port information representing the port assigned to the information processing apparatus in the assigning step, such that the identification information and the port information are associated with each other. When the port is specified by an information processing apparatus to send job data, job data is processed on condition that the information processing apparatus is an information processing apparatus that is associated with the port in the port-status management table, and the port-status management table is updated after completion of reception of the job data so as to cancel the association between the port and the information processing apparatus.

The present invention, in another aspect thereof, provides a program that is executed in a data processing apparatus that sends information representing a port for receiving job data to an information processing apparatus in response to a request from the information processing apparatus so that specified job data is received by the port. The program includes an assigning function of assigning the port to the information processing apparatus that has sent the request; a port-status management function of managing identification information for identifying the information processing apparatus and port information representing the port assigned to the information processing apparatus by the assigning function, such that the identification information and the port information are associated with each other; and a function of processing job data and closing the port after completion of reception of job data when the port is specified by an information processing apparatus to send job data, on condition that the information processing apparatus is an information processing apparatus that is associated with the port by the port-status management function.

The present invention, in another aspect thereof, provides a program that is executed in a data processing apparatus that sends information representing a port for receiving job data to an information processing apparatus in response to a request from the information processing apparatus so that specified job data is received by the port. The program includes an assigning function of assigning the port to the information processing apparatus that has sent the request; a port-status management function of managing identification information for identifying the information processing apparatus and port information representing the port assigned to the information processing apparatus by the assigning function, such that the identification information and the port information are associated with each other; and an updating function of processing job data and updating the port status managed by the port-status management function after completion of reception of the job data so as to cancel the association between the port and the information processing apparatus when the port is specified by an information processing apparatus to send job data, on condition that the information processing apparatus is an information processing apparatus that is associated with the port by the port-status management function.

Further objects, features and advantages of the present invention will become apparent from the following description of the preferred embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a diagram showing packet data in an XML format, transmitted from a host computer to the printing apparatus in the embodiment of the present invention.

FIG. 4 is a diagram showing packet data in an XML format, transmitted from the printing apparatus to the host computer in the embodiment of the present invention.

FIG. 5 depicts a port-status management table stored in a RAM in the embodiment of the present invention, in which printing ports are associated with IP addresses of host apparatuses.

FIG. 6 depicts a port-status management table according to another embodiment of the present invention.

FIG. 7 depicts a port-status management table according to another embodiment of the present invention.

DESCRIPTION OF THE EMBODIMENTS

Now, an embodiment of the present invention will be described in detail with reference to the drawings. Although the embodiment will be described in the context of a printing apparatus as an example of data processing apparatus, the present invention may be applied to data processing apparatuses such as copying machines, facsimile machines, scanners, or multifunction machines, without limitation to printing apparatuses. Furthermore, the type of job data exchanged may be jobs other than print jobs, for example, copy jobs, facsimile jobs, or scan jobs, in accordance with the type of data processing apparatus.

Figure 1:
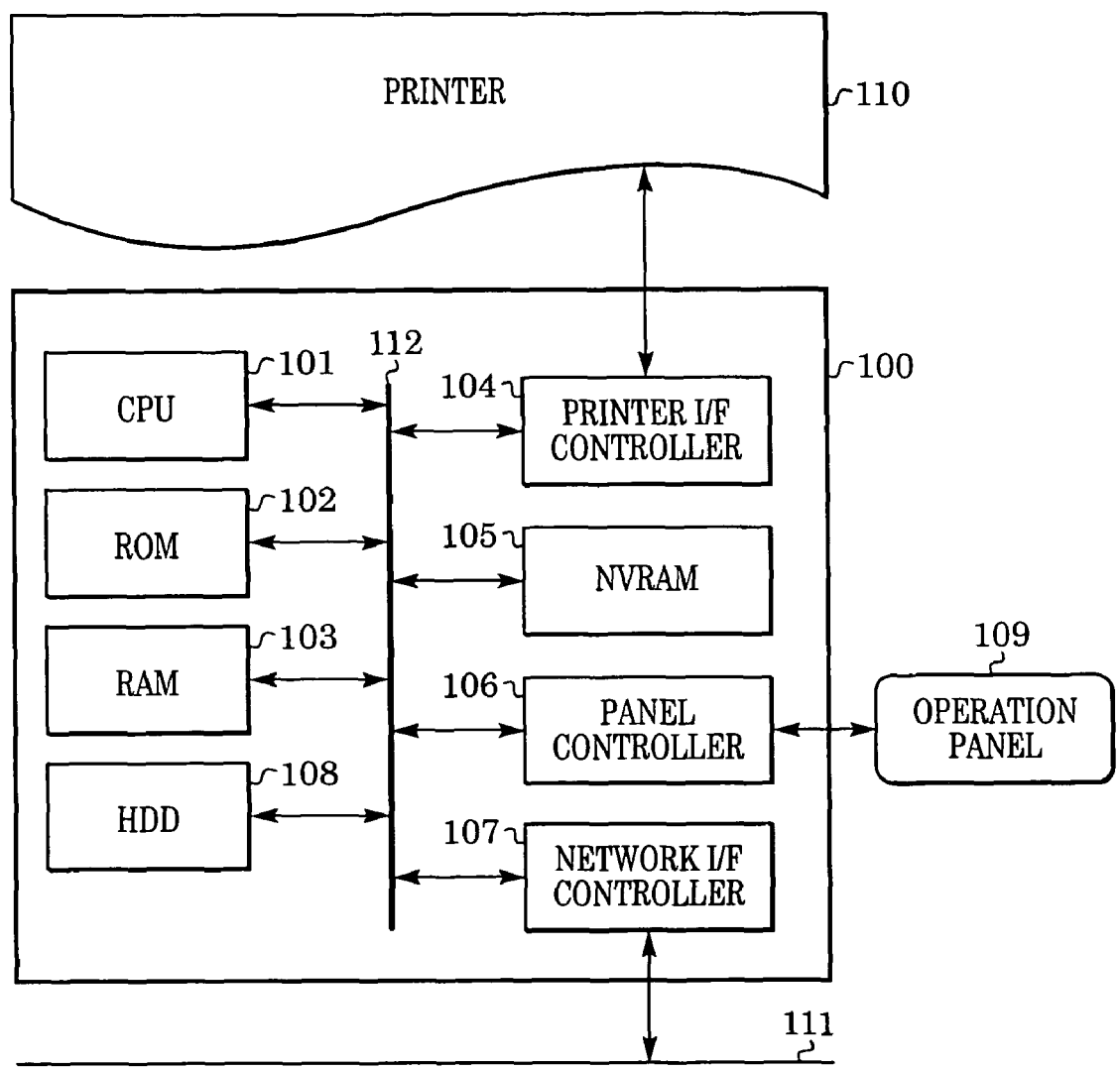
FIG. 1 is a block diagram showing the hardware configuration of a printing apparatus according to an embodiment of the present invention.

FIG. 1 is a block diagram showing the hardware configuration of a printing apparatus according to an embodiment of the present invention. Referring to FIG. 1, a central processing unit (CPU) 101 executes a software program of the printing apparatus to control the entire printing apparatus. A read-only memory (ROM) 102 stores a boot program of the printing apparatus, fixed parameters, and so forth. A random access memory (RAM) 103 is used, for example, to temporarily store data when the CPU 101 controls the printing apparatus. A hard disk drive (HDD) 108 is used to store various data, e.g., print data. A printer interface (I/F) controller 104 controls a printer 110. A non-volatile RAM (NVRAM) 105 is used to save various parameters of the printing apparatus. A panel controller 106 controls an operation panel 109 to allow display of various information and input of commands by a user. A network I/F controller 107 controls exchange of data with a local area network (LAN) 111. A system bus 112 is connected to the CPU 101, the ROM 102, the RAM 103, the HDD 108, the printer I/F controller 104, the NVRAM 105, the panel controller 106, and the network I/F controller 107. The system bus 112 carries control signals from the CPU 101 and data signals among the components.

Figure 2:
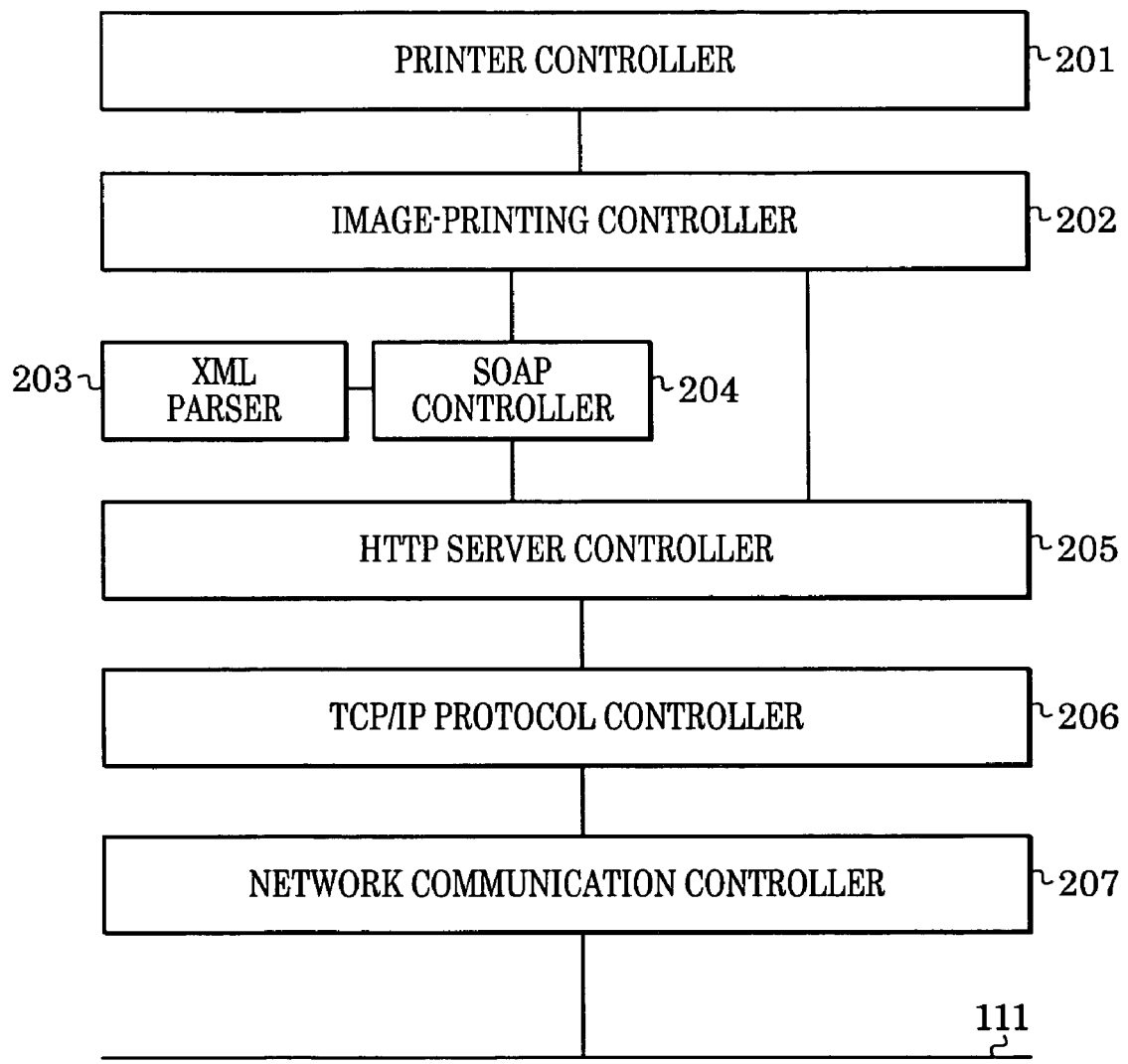
FIG. 2 is a block diagram showing the software configuration of the printing apparatus according to the embodiment of the present invention.

FIG. 2 is a block diagram showing the software configuration of the printing apparatus 100 according to this embodiment. Referring to FIG. 2, a printer controller 201 is a module that controls the printer I/F controller 104. The printer controller 201 performs operations such as sending image data to the printer 110 and controlling sheet ejecting position. An image-printing controller 202 converts print data received into data printable by the printer 110, and performs various control operations relating to printing such as controlling the number of copies or setting of two-sided printing. A network communication controller (i.e., network driver) 207 controls the network I/F controller 107 to control exchange of data with a network. A TCP/IP protocol controller 206 includes a module that controls operations based on the TCP/IP protocol. The TCP/IP protocol controller 206 controls exchange of data according to the TCP/IP protocols using the network communication controller 207. An HTTP (Hypertext Transfer Protocol) server controller 205 is a module that controls operations based on HTTP. The HTTP server controller 205 exercises control to analyze an HTTP request packet received from a client and processes the packet, passing data to an upper-layer application such as a SOAP (Simple Object Access Protocol) controller 204 or the image-printing controller 202, and to return an HTTP response packet to the client according to an instruction by the upper layer application. The SOAP controller 204 is a module that controls operations based on SOAP. The SOAP controller 204 exercises control to use an XML (Extensible Markup Language) parser 203 to either analyze data in an XML format received from a client, calling a suitable module of the image-printing controller 202, or to convert data to be returned to the client into XML data, where the XML data is returned to the client via the HTTP server controller 205. The XML parser 203 is a module that receives input of XML data and outputs a result of analyzing the XML data.

FIG. 3 shows an example of packet data referred to as create_job, which is sent from a client to the printing apparatus using SOAP over HTTP in this embodiment. This data is written in an XML format. The create_job packet is a command that requests the printing apparatus to start a job (printing). The create_job packet includes description of information such as a name of a requesting user (requesting-user-name tag) and an instruction regarding processing of the job (job-instruction tag). The printing apparatus, upon receiving the command, creates a printing port and returns a response packet if the content of the command is error free. If an error is found in the content of the command, the printing apparatus returns an error response.

FIG. 4 shows an example of response packet data to the create_job packet shown in FIG. 3. Similarly to the create_job packet shown in FIG. 3, the response packet data is also written in an XML format, and is exchanged using SOAP over HTTP in this embodiment. The create_job response packet includes information such as a result code for the create_job command (result-code tag) and a URI of a printing port (data-sink-uri tag). In FIG. 4, a URI "http://123.456.7.8:10001/job" is shown.

FIG. 5 depicts a port-status management table located in the RAM 203 in this embodiment, in which printing ports are associated with identification information of host apparatuses (e.g., IP addresses). In the example shown in FIG. 5, a port number "10001" is associated with an IP address "123.456.1.XXX" of a host apparatus to which the port is assigned. The table also includes information "OPEN" indicating that the port is being used. As for port number "10002", the port is not assigned to any host apparatus, so that the port is not associated with any IP address. Since this port is not being used, information "CLOSE" is shown. When a print start request (create_job) is transmitted from another host apparatus on the network, a port controller refers to the port-status management table to choose a port that is in "CLOSE" status, i.e., a port that is not currently assigned to any host, and assigns the port to a host apparatus that has issued the print start request.

Although port numbers are managed in the example shown in FIG. 5, alternatively, as shown in FIG. 6, management may be based on URIs sent to host apparatuses as responses to create_job command packets instead of the port numbers.

The port-status management table may be such that only those ports assigned to (i.e., being used by) any host apparatus are shown, as depicted in FIG. 7. In that case, the port controller selects an available port that is not in the table when newly assigning a port. In this case, since all the ports in the table are being used (OPEN), management as to whether ports are OPEN or CLOSE, as shown in FIG. 5, is not exercised.

As described above, the port controller uses the port-status management table to determine whether a port is not being used when assigning a port to a host apparatus. Furthermore, since assignment of ports being used to host apparatuses is managed in the port-status management table, the port-status management table is also used to determine whether a host apparatus that has sent print data to a port is a host apparatus that is associated with the port.

Figure 8:
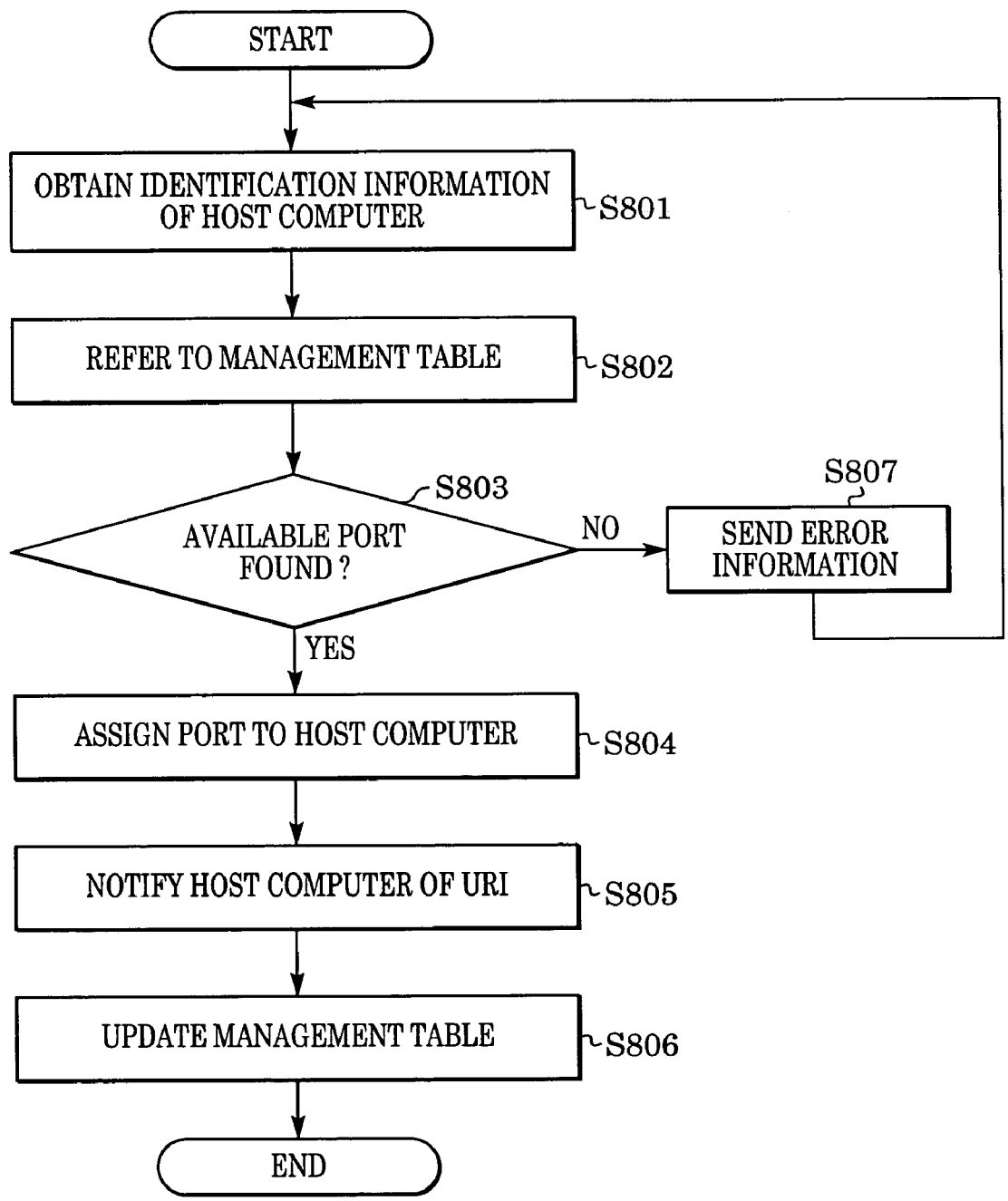
FIG. 8 is a flowchart showing a print-start-request receiving operation in the embodiment of the present invention.

FIG. 8 is a flowchart showing an operation, according to this embodiment, that is executed by the printing apparatus when create_job is received (i.e., a print-request receiving operation).

When the create_job packet shown in FIG. 3 is received by the printing apparatus, the operation proceeds to step S801, in which identification information of a host computer, such as an IP address, is obtained. The IP address is used to identify the host computer when print data is transmitted. Next, in step S802, the port-status management table is referred to. The operation then proceeds to step S803, in which a search for an available port (i.e., a port under CLOSE status) is performed. If an available port is not found, the operation proceeds to step S807, in which the host computer is notified that an available port was not found. The operation then returns to wait for reception of another print request. If an available port is found, the operation proceeds to step S804, in which the available port is assigned to the information processing apparatus that has sent the create_job packet. Next, the operation proceeds to step S805, where a URI serving as a destination of print data is sent to the host computer as a response to the create_job packet. Then, in step S806, the port-status management table is updated. Upon completion of updating the port-status management table, the operation ends.

Figure 9:
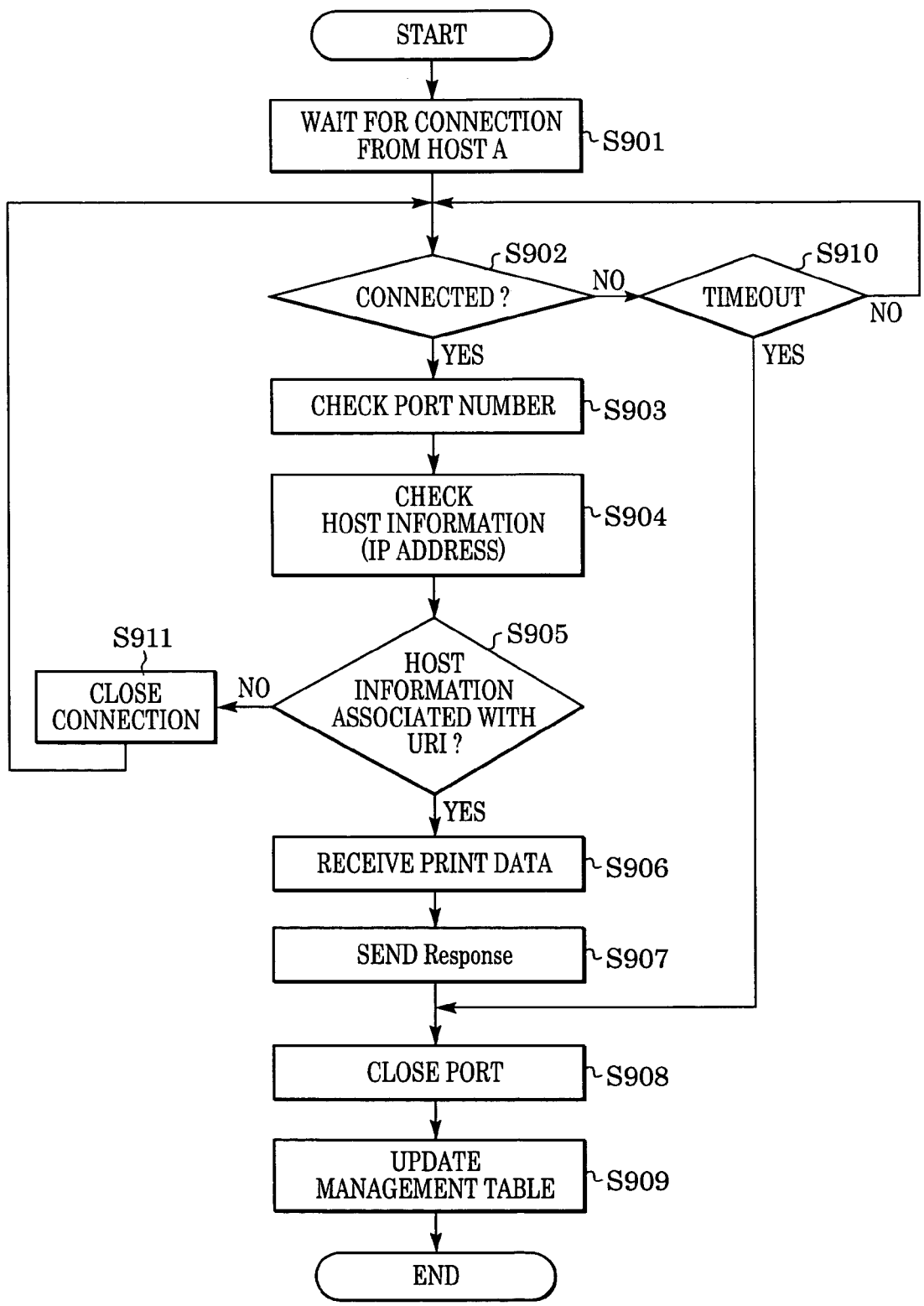
FIG. 9 is a flowchart showing a print-data receiving operation in the embodiment of the present invention.

FIG. 9 is a flowchart showing an operation that is executed when the printing apparatus according to this embodiment receives print data from a host computer (i.e., a print-data receiving operation). The print-data receiving operation is not necessarily executed successively to the print-request receiving operation shown in FIG. 8. It is possible that the print-request receiving operation is executed a plurality of times before the printing apparatus executes the print-data receiving operation.

First, in step S901, the operation waits for a connection to be established with the printing apparatus for a host computer to send print data. Next, in step S902, if a connection for sending print data is established by a host computer, the operation proceeds to step S903. If a connection is not established, then in step S910, a check is made to determine whether a timeout occurred. In this embodiment, the check performed is to determine whether a predetermined period of time has passed since the printing apparatus returned a URI to the host computer as a response to receiving a create_job packet. If a timeout has occurred, flow proceeds to step S908, where the port is closed, and the port-status management table is updated accordingly. If a timeout has not occurred, the operation returns to waiting for a connection by a host computer.

Returning to step S902, as discussed above, when a connection for sending print data is established by a host computer, the operation proceeds to step S903, where a port number for the connection is checked. Then, in step S904, an IP address of the host computer that has established the connection is checked. Next, the operation proceeds to step S905, in which it is determined whether the port number and the IP address of the host computer, obtained in steps S903 and S904, are associated with each other in the port-status management table. If the IP address of the host computer is not associated with the port number, the operation proceeds to step S911, where the connection is immediately closed and subsequent print data is not received. The operation then returns to step S901, and waits for a connection by a host computer. If, in step S905, the IP address of the host computer is associated with the port number, the operation proceeds to step S906, in which subsequent print data is received.

When reception of the print data is completed, the operation proceeds to step S907, where a response indicating completion of the reception of print data is sent. Then, in step S908, the port used is closed. Finally, in step S909, the port-status management table is updated accordingly. The print-data receiving operation then ends.

Figure 10:
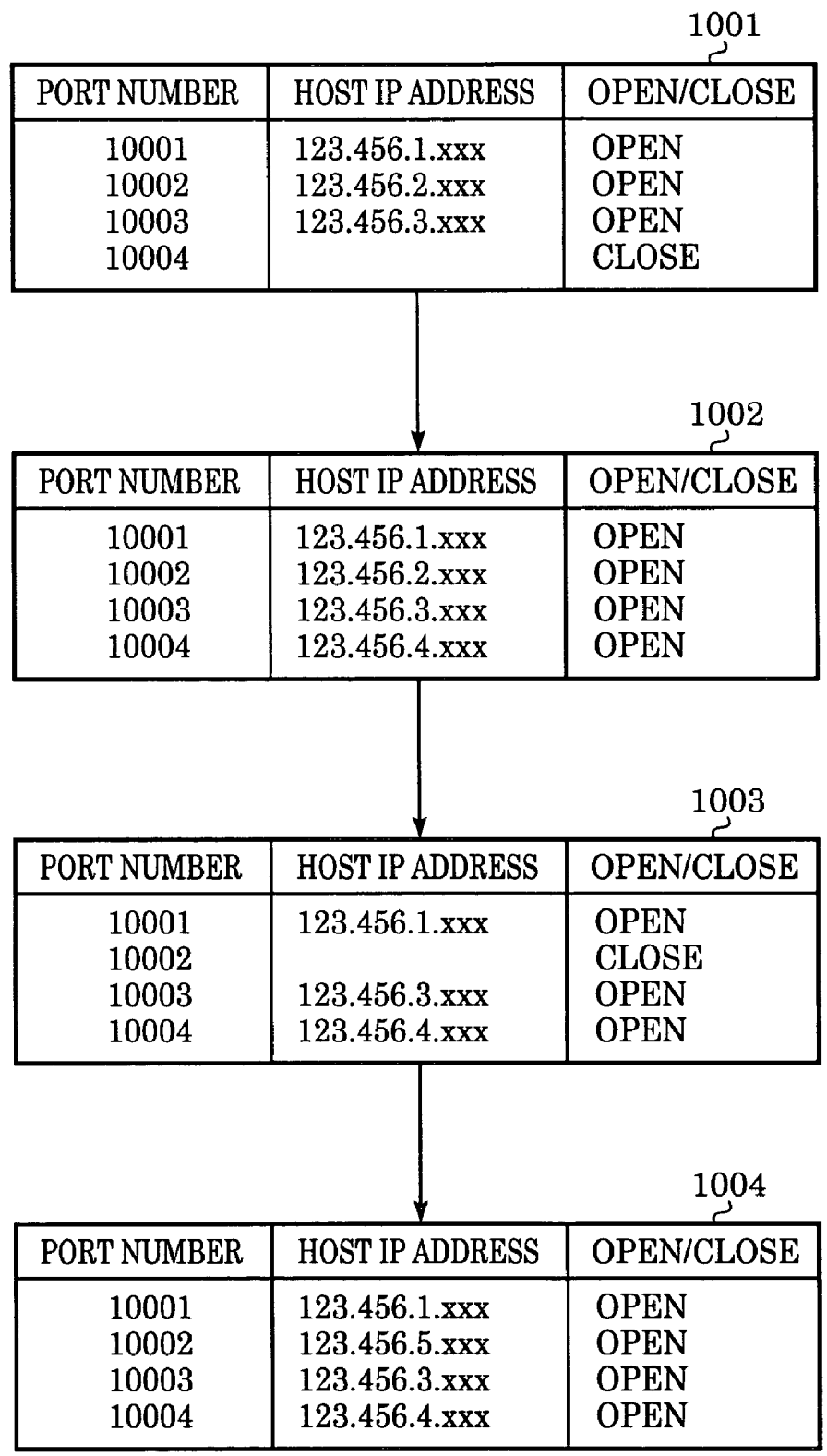
FIG. 10 is a diagram showing a flow of updating the port-status management table in the embodiment of the present invention.
Figure 11:
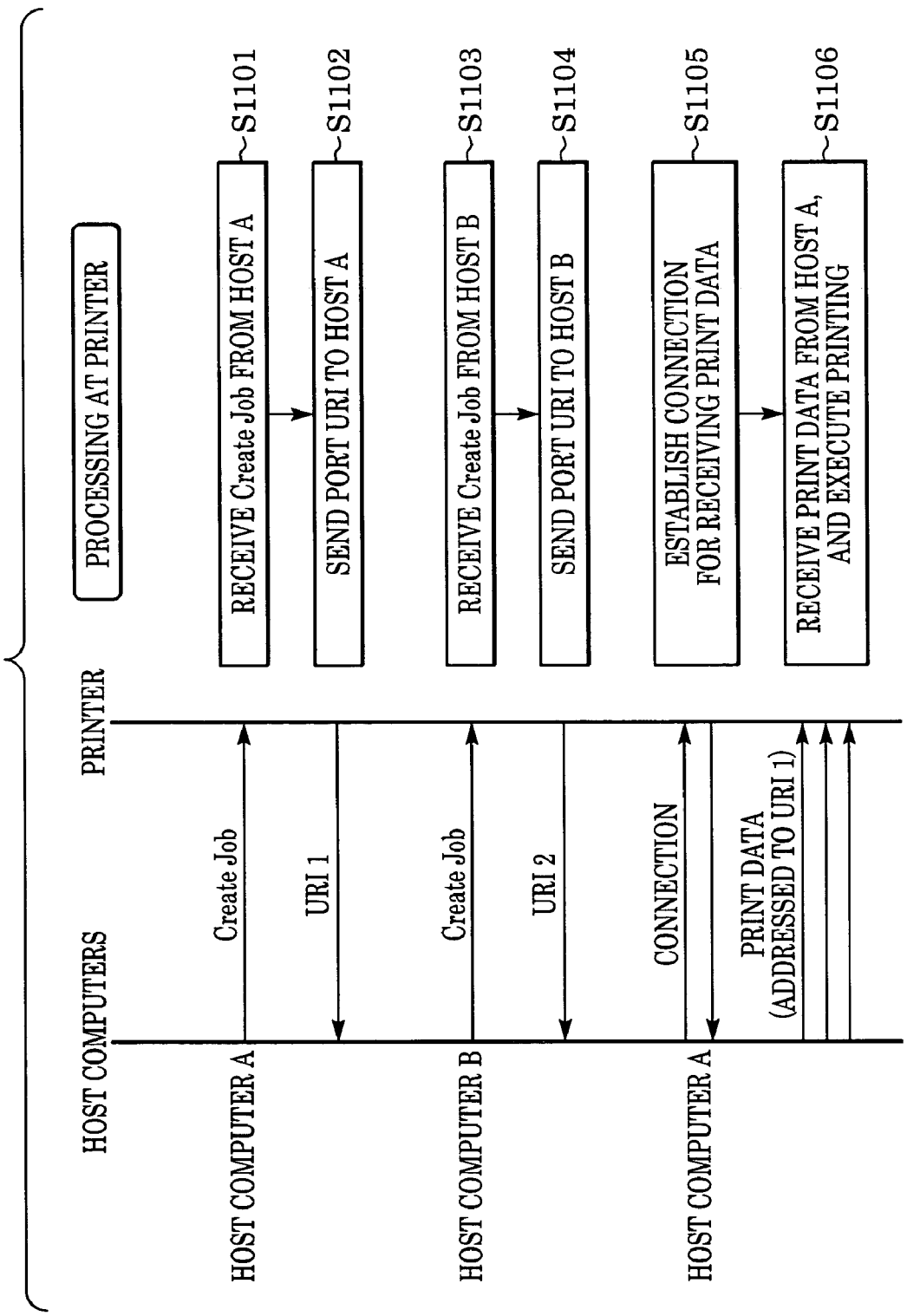
FIG. 11 is a diagram showing exchange of data between host computers and a printing apparatus according to the related art.

FIG. 10 is a diagram showing a flow of updating the port-status management table from reception of a create_job packet from a host computer to completion of reception of print data. A table updating process described below is executed by an assigning unit in the printing apparatus.

Turning to FIG. 10, table 1001 is a port-status management table. As an example, a port 10001 is assigned to a host X (123.456.1.XXX), a port 10002 is assigned to a host Y (123.456.2.XXX), and a port 10003 is assigned to a host Z (123.456.3.XXX). These ports are in OPEN status. A port 10004 is not assigned to any host and is therefore in CLOSE status. When the printing apparatus receives a create_job packet from the host A (123.456.4.XXX), the port controller assigns the port 10004 to the host A by referring to the port-status management table, changing the status of the port 10004 to OPEN, as shown in a table 1002. Then, when print data is transmitted from the host Y to the port 10002 and the processing is completed, the status of the port 10002 is updated to CLOSE, as shown in a table 1003. Then, when a create_job packet is transmitted from the host B (123.456.5.XXX), the port 10002 that is currently in CLOSE status is assigned to the host B, as shown in a table 1004.

As described above, the assigning unit dynamically updates the port-status management table and assigns a port when a create_job packet or print data is received from a host computer.

It is to be understood that the objects of the present invention can also be achieved by a storage medium storing program code of software implementing the functions of the embodiment described above, the program code stored in the storage medium being read and executed by a computer (a CPU or an MPU) of a system or an apparatus.

In that case, the functions of the embodiment described above are implemented by the program code read from the storage medium, so that the storage medium storing the program code constitutes the present invention.

The storage medium for supplying program code may be any storage medium, for example, a floppy disk, a hard disk, an optical disk, a magneto-optical disk, a CD-ROM, a CD-R, a DVD-ROM, a DVD-R, a magnetic tape, a non-volatile memory card, a ROM, a storage device of a file server on a network, or a storage device of an FTP server on the Internet.

Furthermore, instead of implementing the functions of the embodiment by a computer reading and executing program code, the functions of the embodiment may be implemented by executing actual processing in part or in entirety according to program code by an operating system (OS) or the like running on a computer. This also falls within the scope of the present invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A printing apparatus comprising:
   a receiving unit configured to receive a request from an information processing apparatus;
   an assigning unit configured to, in response to the receiving unit receiving the request, assign a printing port which is not assigned to another information processing apparatus among a plurality of printing ports which are provided in the printing apparatus and which can be used for receiving print data, to the information processing apparatus;

a notification unit configured to notify the information processing apparatus of a URI which includes the printing port assigned to the information processing apparatus; and a management unit configured to manage identification information for identifying the information processing apparatus and port information representing the assigned printing port based on the URI notified by the notification unit, such that the identification information and the port information are associated with each other by creating a state that the port cannot be assigned to the other information processing apparatus, wherein when no assignable printing port exists, the assigning unit does not assign any ports to the information processing apparatus, and the notification unit notifies the information processing apparatus of an error, and wherein when the print data is sent to the assigned printing port, the sent print data is processed on condition that the print data is sent from the information processing apparatus which is associated with the assigned printing port.

2. The printing apparatus according to claim 1, wherein when the print data is sent from the information processing apparatus which is not associated with the assigned printing port by the port-status management unit, the sent print data is not processed.

3. The printing apparatus according to claim 1, wherein when the print data is sent from the information processing apparatus which is not associated with the assigned printing port by the port-status management unit, the sent print data is not received.

4. The printing apparatus according to claim 1, wherein, after the processing of the print data is completed, the association between the assigned printing port and the information processing apparatus is released.

5. A printing method comprising:

receiving a request from an information processing apparatus;

assigning, in response to reception of the request, a printing port which is not assigned to another information processing apparatus among a plurality of printing ports which are provided in a printing apparatus and which can be used for receiving print data, to the information processing apparatus;

notifying the information processing apparatus of a URI which includes the printing port assigned to the information processing apparatus; and managing identification information for identifying the information processing apparatus and port information representing the assigned printing port based on the notified URI, such that the identification information and the port information are associated with each other by creating a state that the port cannot be assigned to the another information processing apparatus, wherein when no assignable printing port exists, the assigning does not assign any ports to the information processing apparatus, and the notifying notifies the information processing apparatus of an error, and wherein when the print data is sent to the assigned printing port, the sent print data is processed on condition that the print data is sent from the information processing apparatus which is associated with the assigned printing port.

6. The printing method according to claim 5, wherein when the print data is sent from the information processing apparatus which is not associated with the assigned printing port by the port-status management unit, the sent print data is not processed.

7. The printing method according to claim 5, wherein when the print data is sent from the information processing apparatus which is not associated with the assigned printing port by the port-status management unit, the sent print data is not received.

8. The printing method according to claim 5, wherein, after the processing of the print data is completed, the association between the assigned printing port and the information processing apparatus is released.

9. A computer-readable medium encoded with a computer program that is executed in a printing apparatus, the program comprising:

a receiving function to receive a request from an information processing apparatus;

an assigning function of assigning a printing port which is not assigned to another information processing apparatus among a plurality of printing ports which are provided in the printing apparatus and which can be used for receiving print data to the information processing apparatus;

a notification function to notify the information processing apparatus of a URI which includes the printing port assigned to the information processing apparatus;

a management function of managing identification information for identifying the information processing apparatus and port information representing the assigned printing port based on the notified URI, such that the identification information and the port information are associated with each other by creating a state that the port cannot be assigned to the other information processing apparatus;

a function of, wherein when no assignable printing port exists, not assigning any ports to the information processing apparatus, and notifying the information processing apparatus of an error; and a function of, wherein when the print data is sent to the assigned printing port, the sent print data is processed on condition that the print data is sent from the information processing apparatus which is associated with the printing port.

10. The computer-readable medium according to claim 9, wherein, after the processing of the print data is completed, the association between the assigned printing port and the information processing apparatus is released.

* * * * *